June 19, 1956  A. BRENNER ET AL  2,751,552

THICKNESS GAGE FOR METALLIC COATINGS

Filed Sept. 17, 1952

*INVENTOR*
ABNER BRENNER
BILLY J. WAGONER

BY Howard L. Rose

AGENT

United States Patent Office 2,751,552
Patented June 19, 1956

2,751,552

THICKNESS GAGE FOR METALLIC COATINGS

Abner Brenner, Chevy Chase, Md., and Billy J. Wagoner, Arlington, Calif., assignors to the United States of America as represented by the Secretary of Commerce Application September 17, 1952, Serial No. 310,148

3 Claims. (Cl. 324—34)

(Granted under Title 35, U. S. Code (1952), sec. 266)

The invention described herein may be manufactured and used by or for the Government of the United States for governmental purposes without the payment to us of any royalty thereon in accordance with the provisions of the act of March 3, 1883, as amended (45 Stat. 467; 35 U. S. C. 45).

The present invention relates to a device for measuring the thickness of a metallic coating upon a metallic base. The determination of the thickness of a coating is an important measurement, since the useful life of an object may depend largely upon the thickness of the coating. At present numerous magnetic devices are available for measuring the thickness of metallic coatings on a metallic base where the magnetic properties of the coating are different from the magnetic properties of the base metal. Also numerous methods exist for determining the thickness of a coating where either the coating or the base is nonmetallic. However, at present no convenient devices are available for measuring the thickness of nonmagnetic metallic coatings upon nonmagnetic metal base materials. An X-ray method has been developed for measuring tin coatings on steel, but the instrument is extremely expensive and is not portable. A beta-ray back scattering device has been developed for measuring the thickness of films, but it requires an area about three inches in diameter and therefore yields an average thickness rather than the local thickness of the coating. A simple satisfactory method for measuring the thickness of a metal coating upon a base of another metal, neither of which is magnetic, has not been previously developed.

An object of the present invention is to provide a thickness gage for measuring the thickness of metallic coatings on metallic bases in combinations of metals which differ in electrical resistivity or in magnetic properties.

Another object of the invention is to develop a cheap portable direct-reading instrument for nondestructively measuring the local thickness of a nonmagnetic metallic coating on a nonmagnetic basis metal.

Another object of the invention is to develop an instrument to determine the thickness of a metallic coating on a metallic base by inducing eddy currents in the metallic coating.

In accordance with one embodiment of the present invention a bridge-type circuit is provided having a coil, which forms the test probe, and a diode in one arm and a similar coil and diode in an adjacent arm. The other two arms of the bridge contain resistors. The test coil is shunted by a capacitor which is so chosen that before a measurement is made the test coil and condenser will resonate at the frequency of the input voltage. The frequency of the input voltage is in the order of hundreds of kilocycles or higher so that the eddy currents induced in the specimen to be measured are restricted for the most part to the coating, the thickness of which is to be measured. Since each metal has its own characteristic resistivity the eddy currents induced will be a function of the coating and the base metal. By restricting a large proportion of the eddy current to the coating, the instrument can be made very sensitive to the thickness of the coating. The bridge, which is initially balanced, will be thrown out of balance when the probe is brought into contact with the specimen under test, because the eddy current losses induced in the coating are reflected back into the probe circuit and behave as a parallel resistive load shunted across the coil. Also some detuning of the circuit occurs.

Other uses and advantages of the invention will become apparent upon reference to the specification and drawings.

Figure 1:
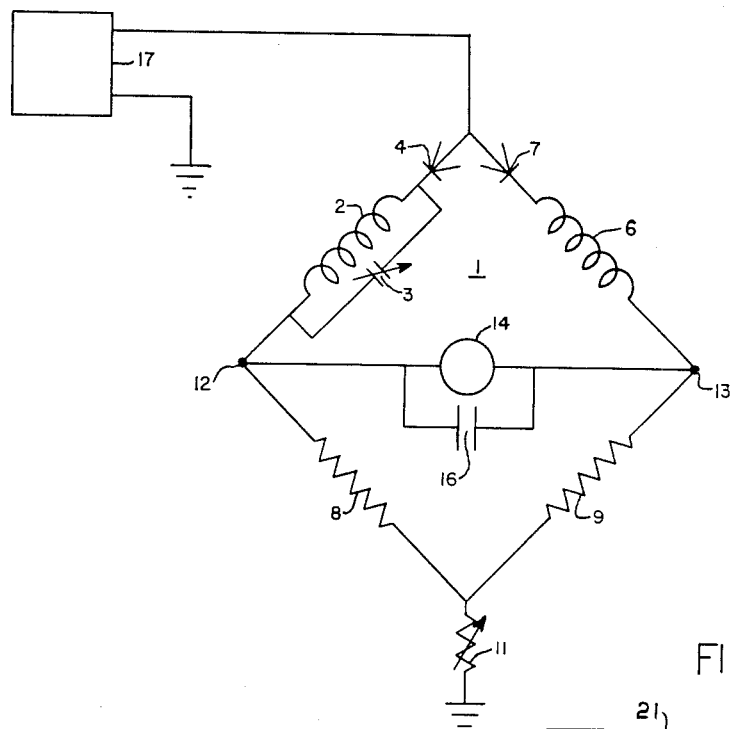
Figure 1 is a schematic diagram of one embodiment of the invention.

Referring to Figure 1, there is shown a bridge-type circuit 1 having a coil 2 shunted by a variable condenser 3 in one arm of the bridge. Also included in that arm of the bridge is a rectifier 4. Coil 2 is wound on the test probe of the instrument and when a coating thickness is to be measured, the probe is brought into contact with the coating. The second arm of the bridge consists of a rectifying element 7 and of a coil 6 having characteristics similar to the coil 2. The two lower arms of the bridge contain the resistive elements 8 and 9. The junction of these two resistors is connected to ground through the variable resistor 11 which is used to adjust the current through the bridge. Connected between the junctions 12 and 13 of the bridge is a direct-current ammeter 14, which is shunted by the condenser 16 which is used to pass any residual alternating current around the meter. The bridge is fed from a high-frequency source 17. In operation the bridge is initially balanced so that no current passes through the meter 14; also the condenser 3 is varied until the tank circuit consisting of a probe coil 2 and condenser 3 is tuned to the resonant frequency of the source 17. With this adjustment the tank circuit will resonate at the frequency of the source and the current through that branch of the bridge will be very small. The frequency of the source should be rather high—at least above fifty kilocycles—so that eddy currents induced in the test specimen will appear predominately in the coating. This is particularly important since the magnitude of the eddy current induced in the metal is a function of the resistivity of the metal. If a large percentage of the eddy currents were allowed to flow into the base metal the sensitivity of the measurement of the thickness of the coating would be considerably reduced.

In measuring a combination consisting of a highly conductive coating on a poorly conducting base metal, the eddy currents are restricted for the most part to the metallic coating and the readings are determined almost entirely by the thickness of the coating; and the effect of the base metal is negligible. As previously stated, when the bridge circuit is initially adjusted, the current through the meter 14 is zero. When the test probe containing the coil 2 is brought into contact with the coating to be measured, the current through this branch of the bridge will change and cause a voltage to appear between the terminals 12 and 13, which will be measured by the meter 14. This increase in current is due to two factors, one is the increase in current to supply the eddy current losses in the coating, and the other is due to the detuning of the tank circuit because of the change in inductance of the coil 2 when the probe contacts the metal. The current flow through the meter is indicative of the thickness of the particular combination of metal coating and metal base under observation. Since the resistivity of the coating and base combination will vary for each combination of metals, it is necessary to obtain calibration curves for each combination of metals to be examined. When, however, a highly conductive coating is plated on a nonconductive base, the same calibration curve can be used for the combination of that particular coating on any nonconductive base.

This instrument is not limited in use to combinations of nonmagnetic coatings on nonmagnetic metallic bases but may be used with metallic coatings and bases of any combination of magnetic and nonmagnetic metals and nonmagnetic coatings or bases. However, since there are a number of instruments already available for these measurements, the present invention is particularly concerned with the case of the nonmagnetic metal coated on a nonmagnetic metal base.

Rectifying elements, such as 4 and 7, are placed in each of the upper arms of the bridge instead of using a single rectifier in the input to the bridge. With a single rectifier equal changes in current occur in both parallel circuits of the bridge. The rectifier 7 in the reference arm serves to maintain the current in that arm isolated and virtually unaffected by changes of current through 2 and 4.

Figure 2:
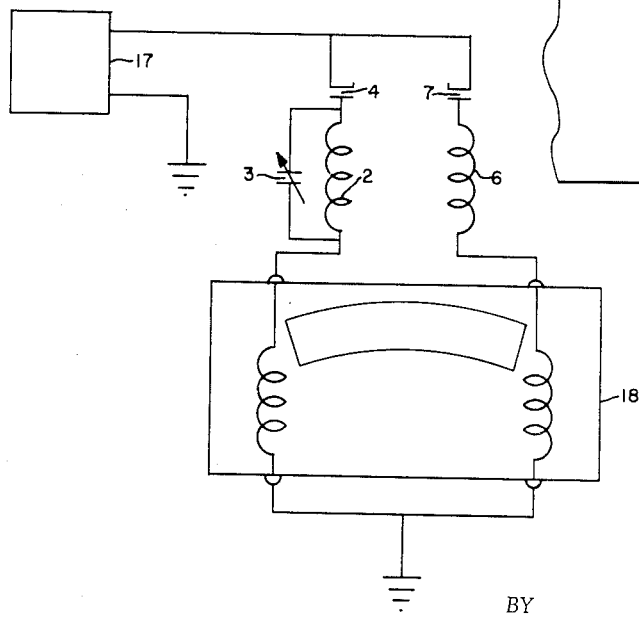
Figure 2 is a schematic diagram of another embodiment of the present invention.

The embodiment shown in Figure 1 employs a bridge-type circuit. However, this is not the only form of the invention that may be employed, and as long as a probe coil and two rectifiers, shown in the two upper arms of this bridge, are used in conjunction with the two lower resistors, a workable instrument may be obtained. Such an instrument is shown in Figure 2. Coil 6 may be replaced by a resistor.

In Figure 2, the coil 2, condenser 3, and rectifier 4 appear as one branch of a parallel circuit and a coil 6 and rectifier 7 appear as the other branch of the circuit. Each branch is connected to a separate input of a differential galvanometer 18. In this embodiment the difference in current flow through the two branches is measured by the differential galvanometer when a test is being made. By properly adjusting the values of the components in the two branches, the initial reading on the galvanometer can be made to be zero. Again when the probe contacts the coating the current through that branch of the circuit and the galvanometer will register the change which will be indicative of the coating thickness.

It has been found that the sensitivity of the bridge increases as the frequency is increased. However, the higher the frequency the smaller is the range of thickness which can be measured. Therefore as the thickness of the coatings decreases, the frequency should be raised. It has been found that about 2 megacycles is a good point of operation for most cases.

Figure 3:
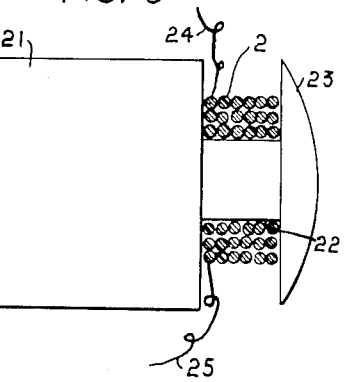
Figure 3 is a schematic diagram of a test probe used in the present invention.

Fig. 3 shows a schematic diagram of a test probe used successively with a 0.0012-microfarad capacitor at a frequency of about 2.5 megacycles to measure coating thickness of the order of 0 to 1.5 mils. Winding 2 consists of 50 turns of No. 40 wire wrapped around a sapphire bobbin 21 having a diameter of 0.09 inch and having at region 22 a reduced winding diameter of 0.03 inch and a winding length of 0.04 inch. Leads 24 and 25 provide means for connecting winding 2 in the circuit. End portion 23 of bobbin 21 extends 0.015 inch beyond coil 2 and is rounded to provide point contact between the probe and an object being measured. The probe should be of small dimensions to minimize the effect of geometry of the object on the readings. Coil design for good sensitivity has been found to be rather critical.

It will be apparent that the embodiments shown are only exemplary and that various modifications can be made in construction and arrangement within the scope of our invention as defined in the appended claims.

We claim:

1. A gage for measuring nondestructively the local thickness of a nonmagnetic metallic coating on a nonmagnetic metallic base, said gage comprising: a first circuit having a unilateral conducting device in series with a parallel combination of a point contact type probe having wound thereon a self-inductance test coil with a diameter of less than one-eighth inch and a variable capacitor, said coil and capacitor combination being resonant at a frequency in excess of 100 cycles; a second circuit having a unilateral conducting device in series with an impedance, said second circuit being connected in parallel with said first circuit; a first means for supplying to said first and second circuits an alternating current of a frequency that is greater than 100 cycles and that is approximately equal to the resonant frequency of said coil and capacitor combination in said first circuit; and a second means for comparing the current through said first and said second circuits.

2. The invention according to claim 1 in which said first and second circuits form two arms of a bridge-type circuit; and in which said second means is a direct-current meter connected across the output of said bridge.

3. The invention according to claim 2 in which said meter is adapted to indicate the thickness of said metallic coating when said test coil is placed near said metallic coating, the frequency of said first means and the setting of said capacitor being held constant.

References Cited in the file of this patent

UNITED STATES PATENTS

| 1,632,076 | Hubbard | June 14, 1927 |
| 2,057,835 | Karajan et al. | Oct. 20, 1936 |
| 2,337,231 | Cloud | Dec. 21, 1943 |
| 2,353,211 | Zuschlag | July 11, 1944 |
| 2,435,985 | Stewart et al. | Feb. 17, 1948 |
| 2,481,345 | Reynst | Sept. 6, 1949 |
| 2,508,446 | Conant | May 23, 1950 |
| 2,581,394 | Dinger | Jan. 8, 1952 |
| 2,630,780 | Falck | Mar. 10, 1953 |

FOREIGN PATENTS

| 144,039 | Australia | Nov. 1, 1951 |
| 730,973 | Germany | Jan. 29, 1943 |